United States Patent [19]
Boissevain et al.

[11] 3,779,003
[45] Dec. 18, 1973

[54] CABLE CARRIER WITH REMOVABLE PLASTIC LINKS

[75] Inventors: Mathew G. Boissevain, Los Altos Hills; Erik B. Dahlin, Saratoga, both of Calif.

[73] Assignee: Measurex Corporation, Cupertino, Calif.

[22] Filed: Sept. 7, 1972

[21] Appl. No.: 286,853

[52] U.S. Cl. ............................... 59/78.1, 248/49
[51] Int. Cl. ............................................. F16g 13/02
[58] Field of Search................... 59/78.1; 248/49, 248/51, 52

[56] References Cited
UNITED STATES PATENTS 3,284,036  11/1966  Nansel................................ 248/49
3,382,668   5/1968  Berkes............................... 59/78.1
3,664,619   5/1972  Heidrich............................ 59/78.1

*Primary Examiner*—Charles W. Lanham
*Assistant Examiner*—Gene P. Crosby
*Attorney*—Paul D. Flehr et al.

[57] ABSTRACT

A cable carrier consisting of a chain with a plurality of links for conveying electric power, water, etc. to the point of application on equipment-in-motion in which each links consists essentially of plastic and includes U-shaped base and U-shaped cover. The cover has a width less than the distance between the pivot axes on the base to allow for sag in the carrier to thus allow a long length carrier to be used. On the other hand, a fixed radius of curvature is provided so that the cable which is carried is not bent excessively.

9 Claims, 10 Drawing Figures

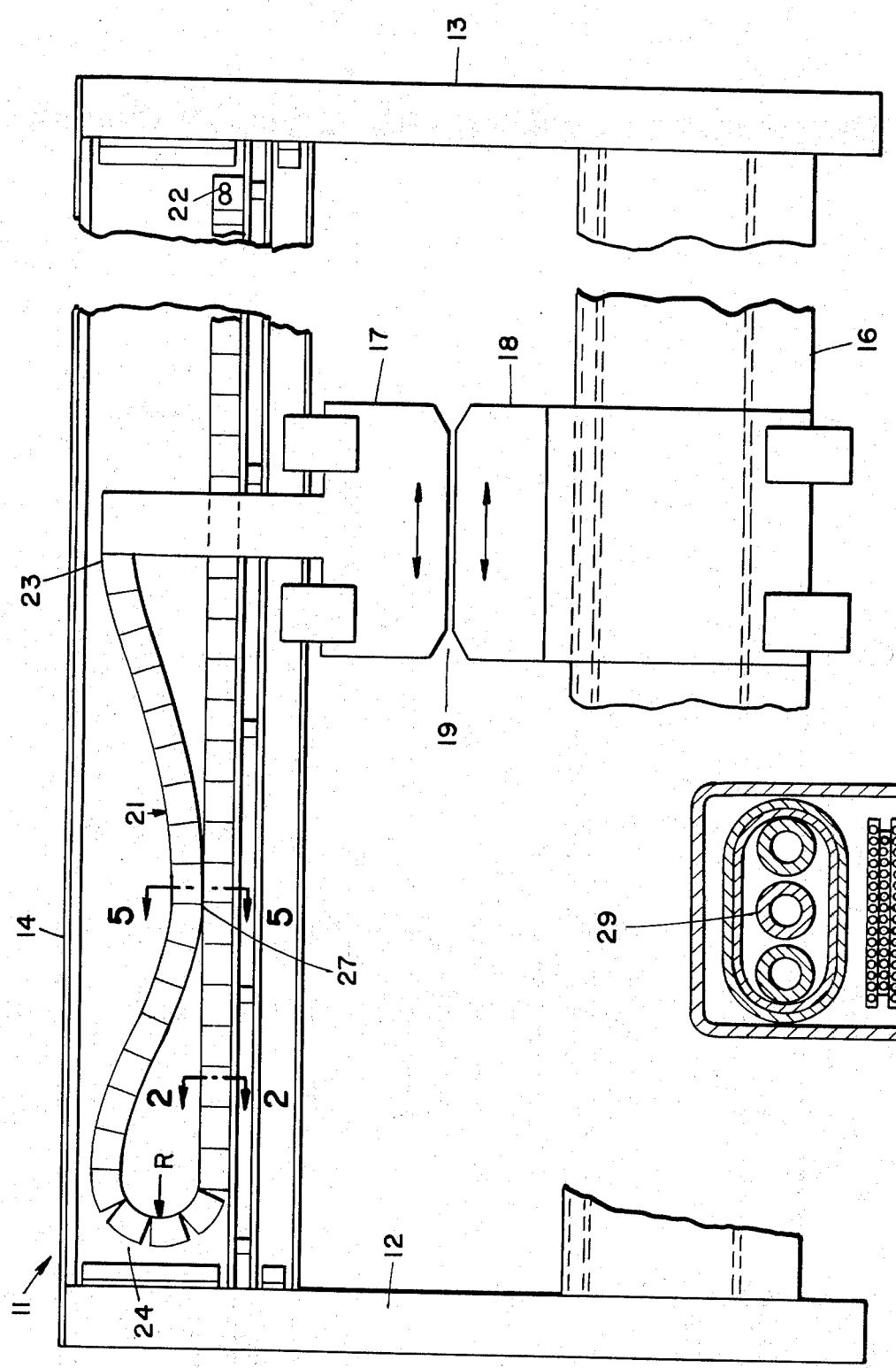

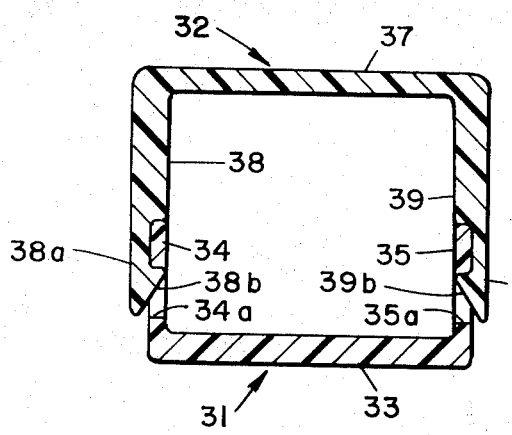
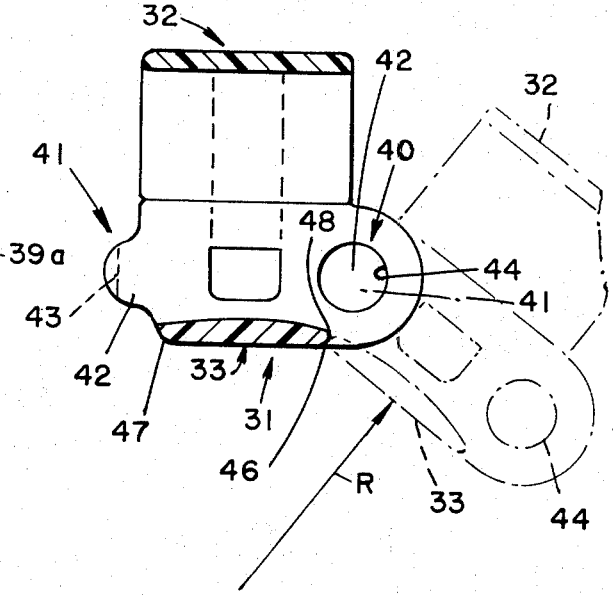
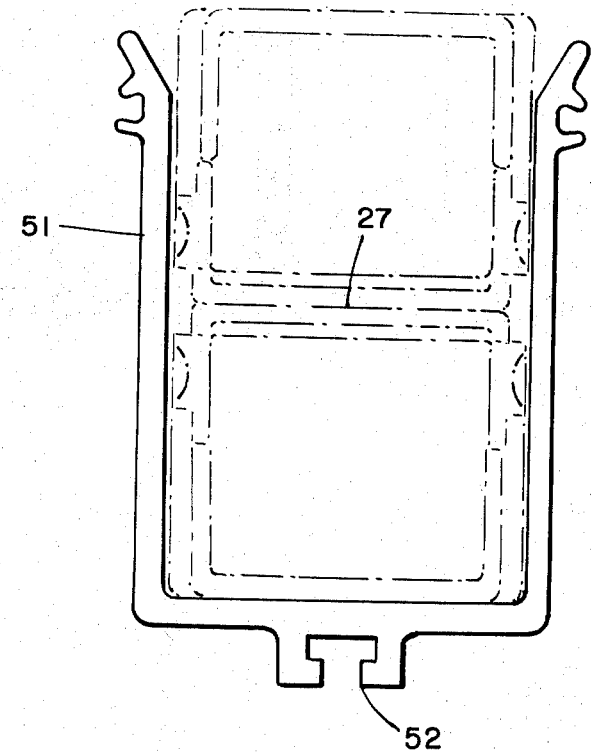

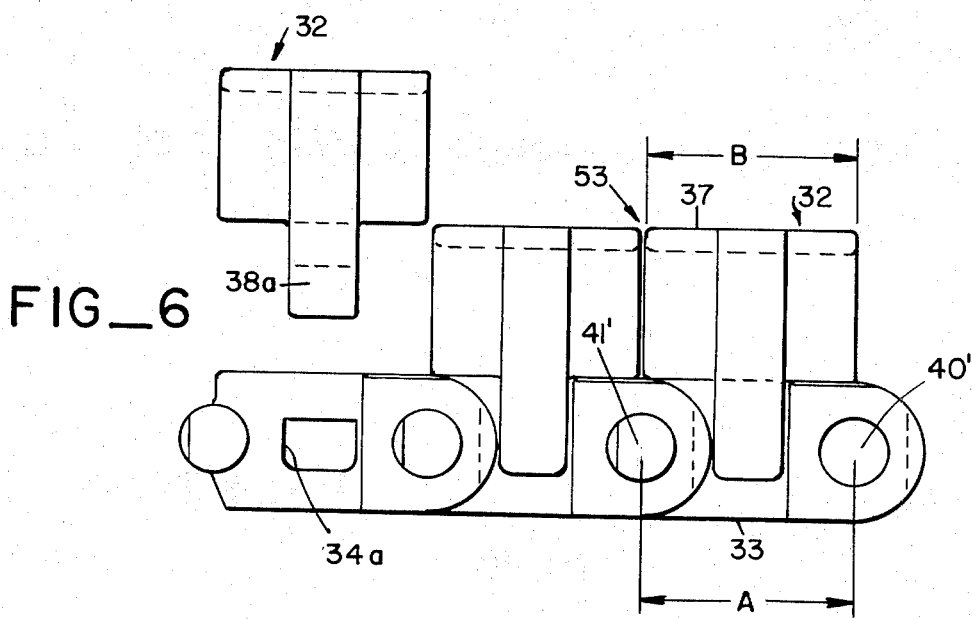
FIG_6
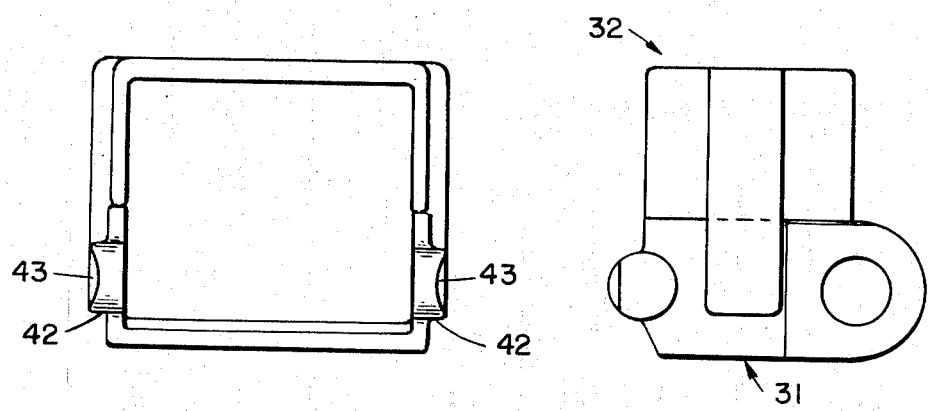
FIG_8　　　FIG_7
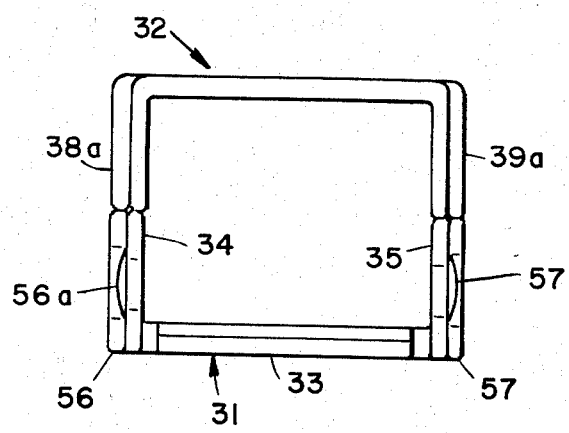
FIG_9
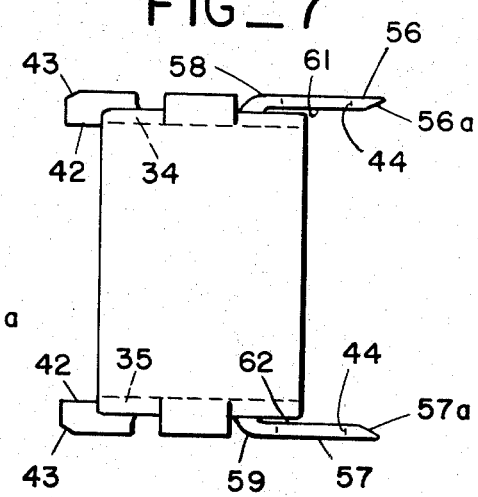
FIG_10

3,779,003

CABLE CARRIER WITH REMOVABLE PLASTIC LINKS

BACKGROUND OF THE INVENTION

The present invention is directed in general to a cable carrier with removable plastic links and more particularly to a carrier used for conveying electric power, water, etc. to a point of application on equipment-in-motion.

One well known cable carrier is marketed under the trademark POWER TRAK, manufactured by Maysteel Products Corp., Gleason Reel Division of Mayville, Wisconsin. This carrier consists of metal links connected by pivot pins. The unsupported length of the carrier acts like a beam supported at its ends. When a specified unsupported length is exceeded roller supports must be used. The use of such supports is unsatisfactory in many applications. Also the unsupported length is subject to excessive wear and corrosion under high speed operation and severe ambient conditions.

Another carrier is manufactured under the trademark FLEX-8 by the Insul-8 Corp. of San Carlos, Calif. which is a subsidiary of The Rucker Company. This carrier is an extruded plastic tube which is cut into links with one side of the tube serving as the hinge between links. In operation, the upper portion of the tube will sag and bear on the lower portion for part of its travel. However, because of the foregoing hinge arrangement, such sag may be excessive and again must be compensated for by rollers with their attendent deficiencies. Also, the FLEX-8 carrier, since it is continuous, does not allow either inspection of the cable or replacement of links. Also, sharp corners at the hinge cause cable fraying.

OBJECTS AND SUMMARY OF THE INVENTION

It is a general object of the present invention to provide an improved cable carrier.

It is another object to provide a cable carrier which has no practical inherent length limitations.

It is another object to provide a cable carrier as above which minimizes deleterious side effects in the carried cable such as fraying.

It is another object of the invention to provide a cable carrier which performs satisfactorily even under extreme ambient conditions.

It is another object to provide a cable carrier which allows convenient access to the cable at any point.

In accordance with the above objects there is provided a multiple cable or hose carrier consisting of a chain with a plurality of links for conveying electric power, water, etc. to a point of application on equipment-in-motion. Each of the links consists substantially of plastic type material and includes a U-shaped base and a U-shaped link cover. The base and cover are adapted to fit together to form a unitary structure. The base has first and second pairs of pivot means of male and female type construction respectively for coupling to the opposite type pivot means of adjacent links. The pivot means each have a pivot axis. The axes of each base is spaced a predetermined distance which is greater than the width of the cover to allow a chain of several unsupported links to sag. Each of the bases has a bight portion whose width is less than the spacing of said axes to provide a fixed radius of curvature when the edges of the bight portions of adjacent links abut.

BRIEF DESCRIPTION OF THE DRAWINGS

FIG. 1 is a simplified side elevational view with certain parts broken away of apparatus incorporating the present invention;

FIG. 2 is a simplified cross-sectional view substantially taken along the line 2—2 of FIG. 1 showing typical cabling carried by the carrier;

FIG. 3 is a more detailed view of FIG. 2;

FIG. 4 is a side view of FIG. 3 but showing an additional link is abutting relationship;

FIG. 5 is a cross-sectional view taken along line 5—5 of FIG. 1;

FIG. 6 is a side view partially exploded of three connected links;

FIG. 7 is a side view of one link;

FIG. 8 is a left end view of FIG. 7;

FIG. 9 is a right end view of FIG. 7; and

FIG. 10 is a top view of FIG. 7.

DETAILED DESCRIPTION OF THE PREFERRED EMBODIMENT

A typical environment of the present invention is illustrated in FIG. 1 where a sheet gauging apparatus is illustrated. It consists of a main frame 11 with a pair of spaced end supports 12 and 13 which extend generally in a vertical direction and a pair of substantially parallel I-beams 14 and 16 which extend generally in a horizontal direction and are secured to the end supports 12 and 13.

Mounted for transverse movement on the I-beams 14 and 16 are an upper gauging head 17 and a lower gauging head 18. A gap 19 therebetween accommodates, for example, a moving sheet of newsprint. In operation the gauging heads 17 and 18 are moved back and forth or as illustrated on the paper from left to right and back again to continuously scan a sheet of newsprint, for example, which is moving in a direction perpendicular to the drawing sheet. Details of such apparatus are more fully shown in U.S. Pat. No. 3,621,259 assigned to the present assignee and in the name of Mathew G. Boissevain one of the co-inventors of the present application.

Gauging heads 17 and 18 require electrical, coolant liquid and purge gas connections to a necessarily fixed point. In accordance with the present invention, a carrier 21 is provided which is fixed at end point 22 and is coupled to the equipment in motion or gauging head 17 at point 23. As is apparent from the drawing, the top portion of the carrier doubles over on itself at the curved portion 24 and includes a sag portion where the upper carrier rides against the lower carrier at the contact area 27. A similar carrier would be utilized for the lower gauging head 18.

FIG. 2 shows a simplified cross-section of the carrier illustrating both an electrical strip-line 28 and flexible hoses 29.

The cross section of FIG. 3 more fully illustrates the two components of a single link of the carrier which includes a U-shaped link base 31 and a U-shaped link cover 32, the cover snapping onto the base to form a unitary structure. Base 31 includes the bight or bottom portion 33 with legs 34 and 35. Similarly, cover 32 includes a top or bight portion 37 with legs 38 and 39. As also shown in FIG. 6, cover 32 includes a pair of extended tabs 38a and 39a for snapping into holes 34a and 35a of base 31. The tabs include latching portions 38b and 39b for hooking the tab portions 38a and 39a into the apertures 34a and 35a.

Moreover, since the entire link structure which includes the cover 32 and the base 31, consists substantially of plastic which is bendable, the cover as illustrated in FIG. 6 is easily removed from its base to provide for inspection or replacement of the cables and hoses. As illustrated in FIG. 4, the base has first and second pairs of pivot means. These include a first pair of male pivot means 41 and a second pair of female pivot means 40. Specifically, the male pivot means 41 are in the form of buttons 42 having a chamfered edge 43 and the female pivot means 40 are in the form of apertures 44 which are of a suitable size for receiving buttons 42.

In phantom view there is illustrated an adjacent link having its male pivot means engaged or coupled to the female pivot means 40. In addition, the bight portion 33 of the base 31 of the phantom view has one edge in engagement with the similar bight portion of the full line view. This abutting occurs at the point 46. Each bight portion 33 includes the chamfered edges 47 and 48 so that when the edges are abutted a smooth interior surface of the carrier is formed and thus eliminates abrasion of the cable due to sharp corners. A fixed radius of curvature indicated by the arrow R on FIG. 1 is formed which prevents excessive bending of the cable which is carried.

The carrier sag at the area 27 shown in FIG. 1 is also shown in the cross-sectional view of FIG. 5. Since the top portion of the carrier rides on the bottom portion, this feature eliminates excessive beam stresses in the carrier. As further illustrated in FIG. 5, the upper and lower carrier portions are carried in an overall U-shaped channel 51 which would be affixed at portion 52 to the horizontal I-beam 14. Channel 51 is not illustrated in the simplified view of FIG. 1. This maintains the alignment of the upper and lower portions of the carrier. Alternatively, of course, the carrier could be utilized in a sideway orientation and vertical channel 51 would not be necessary.

Referring now to FIG. 6, in oreder to provide the above-mentioned sag in the carrier the axis 41' of the male pivot means 41 and the axis 40' of the female pivot means 40 are spaced a distance illustrated as A which is somewhat larger than the width B of cover 32. This provides a gap 53 which thereby allows the sag to occur.

On the other hand, the bight portions 33 necessarily have a width as illustrated in FIG. 4 which is substantially less than the distance A between the axes 41' and 40' to provide the radius of curvature R.

FIG. 7 illustrates a typical link and FIG. 8 the left end view of the link which more clearly shows the chamfered edges 43 on the button 42 to allow for easy coupling of one link to another. This feature also allows for easy extension of the length of the total carrier.

FIG. 9 is a right end view of FIG. 7 which in conjunction with FIG. 10 illustrates the extended tabs 56 and 57 of the base which include the pivot means 40 with apertures 44. These extended tabs also include chamfered portions 56a and 57a for leading onto the chamfered portion of the button 42. In addition, the female pivot means 40 are offset from the legs 34 and 35 of the base at points 58 and 59 and also provided with the grooves 61 and 62 to allow flexure of the tabs 56 and 57. The offset thus provides a torque during longitudinal tension on the overall chain of the carrier which tends to bend the female pivot means 40 toward each other into firmer engagement with the male pivot means 41.

Referring to FIG. 6, the pivot axes 40' and 41' are offset from the bight portions 33, or in other words the bottom of the base, a distance of less than one-half the distance between the bight portions 33 and the top 37 of cover 32. Thus, the pivot axes are located nearer the base 31 than the top 37 of the cover 32. This allows, for example, the strip electric cable 28 as illustrated in FIG. 2 to be located substantially in the center line of the pivot axes 40' and 41' to provide for minimum stretching of the electrical cable. The flexible hoses being, for example, constructed of stretchable materials, can more easily accommodate stretching during the bending of the carrier.

In order to accommodate the sag as illustrated in FIG. 1 in the area of contact 27 between one link of the carrier and another, both the top portion 37 of cover 32 and the bight portion 33 of base 31 have rounded edges so as to provide easy sliding friction. This is further provided by the plastic nature of the material. In addition, as illustrated in FIG. 9 when the carrier is operated in a horizontal orientation or in other words rotated 90° the side portions also present a substantial flat bearing surface to provide for easy sliding.

Thus, the present invention provides an improved cable carrier which may be constructed with extremely long lengths without the need of support rollers. It provides a fixed radius of curvature which prevents excessive bending of cable and also provides pivot points which provide a predetermined cable bend radius and thus minimize the wearing of electrical cable. Also the plastic material minimizes fraying of the cable. The carrier operates under conditions of high speed and temperatures satisfactorily because of the nature of the material used and the mechanical construction as discussed above.

We claim:

1. A multiple cable or hose carrier consisting of a chain with a plurality of links for conveying electric power, water, etc. to a point of application on equipment-in-motion, each of said links consisting substantially of plastic type material and including a U-shaped link base, a U-shaped link cover, said base and cover being adapted to fit together to form a unitary structure said base having first and secon second of pivot means of male and female type construction respectively for coupling to the opposite type pivot means of adjacent links, said pivot means each having a pivot axis, said axes of each base being spaced a predetermined distance which is greater than the width of said cover to allow a chain of several unsupported links to sag, each of said bases having a bight portion whose width is less than said spacing of said axes to provide a fixed radius of curvature when the edges of the bight portions of adjacent links abut.

2. A carrier as in claim 1 where said bight portions include chamfered edges to provide a smooth interior surface when said edges are abutted to form said fixed radius of curvature.

3. A carrier as in claim 1 where said female pivot means snap onto said male pivot means.

4. A carrier as in claim 3 where said bight portions include a pair of slots to allow flexing of said female pivot means when snapped onto said male pivot means.

5. A carrier as in claim 4 where said female pivot means are offset from the legs of said U-shaped base to provide a torque during longitudinal tension on said chain which tends to bend said female pivot means toward each other into firmer engagement with said male pivot means.

6. A carrier as in claim 1 where said male pivot means includes a button having a chamfered edge for leading into said female pivot means which include a circular aperture for receiving said buttons.

7. A carrier as in claim 1 where said covers snap onto said bases.

8. A carrier as in claim 7 where each of said covers includes a pair of extended tabs for snapping into holes in the legs of said base said tabs having latching means for retaining said cover in engagement.

9. A carrier as in claim 1 where said pivot axes are offset from said bight portions less than one-half the distance between said bight portion and the top of said cover.

* * * * *